United States Patent
Sinnl

(10) Patent No.: US 12,374,964 B2
(45) Date of Patent: Jul. 29, 2025

(54) ELECTRICALLY CONTROLLABLE DRIVE ASSEMBLY

(71) Applicant: Robert Bosch GmbH, Stuttgart (DE)

(72) Inventor: Erwin Sinnl, Brackenheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 296 days.

(21) Appl. No.: 17/773,984

(22) PCT Filed: Sep. 28, 2020

(86) PCT No.: PCT/EP2020/077063
§ 371 (c)(1),
(2) Date: May 3, 2022

(87) PCT Pub. No.: WO2021/104717
PCT Pub. Date: Jun. 3, 2021

(65) Prior Publication Data
US 2023/0006519 A1    Jan. 5, 2023

(30) Foreign Application Priority Data
Nov. 28, 2019  (DE) ............ 10 2019 218 441.3

(51) Int. Cl.
*H02K 11/21*   (2016.01)
*H02K 7/00*    (2006.01)

(52) U.S. Cl.
CPC ......... *H02K 11/21* (2016.01); *H02K 7/003* (2013.01)

(58) Field of Classification Search
CPC .. H02K 1/06; H02K 1/17; H02K 1/18; H02K 5/04; H02K 5/124; H02K 7/003;
(Continued)

(56) References Cited

U.S. PATENT DOCUMENTS

| | | | | |
|---|---|---|---|---|
| 5,895,992 A | * | 4/1999 | Dreher | H02K 7/06 310/80 |
| 8,552,675 B2 | * | 10/2013 | Asahi | H02K 29/08 318/400.39 |

(Continued)

FOREIGN PATENT DOCUMENTS

| | | |
|---|---|---|
| CN | 105317495 A | 2/2016 |
| DE | 102010023140 A1 | 12/2011 |

(Continued)

OTHER PUBLICATIONS

JP2014183674A—Translation (Year: 2024).*

(Continued)

*Primary Examiner* — Christopher M Koehler
*Assistant Examiner* — Ahmed F Seck
(74) *Attorney, Agent, or Firm* — NORTON ROSE FULBRIGHT US LLP

(57) ABSTRACT

An electrically controllable drive assembly including an electric motor having a rotor capable of being driven to execute a rotational movement, a motor shaft connected in rotationally fixed fashion to the rotor, and a signal transmitter of a sensor device for the electronic acquisition and evaluation of the angle of rotation of the motor shaft. The signal transmitter is indirectly anchored on the motor shaft via a holding element. The holding element is a hollow cylinder that has an open first end with which the holding element is fastened on the motor shaft and a second end, situated facing away from the motor shaft, and at least one holding element region that extends into the open cross-section of the holding element.

12 Claims, 2 Drawing Sheets

(58) Field of Classification Search
CPC .......... H02K 7/10; H02K 7/102; H02K 7/104;
H02K 7/106; H02K 7/108; H02K 7/112;
H02K 7/114; H02K 11/0094; H02K
11/05; H02K 11/21; H02K 11/33; H02K
11/38; H02K 13/10; H02K 13/12; H02K
13/14; H02K 15/02; H02K 15/028; H02K
15/03; H02K 29/06; H02K 29/14
USPC ........................................................ 310/68
See application file for complete search history.

(56) References Cited

U.S. PATENT DOCUMENTS

| | | | | |
|---|---|---|---|---|
| 2009/0260463 | A1* | 10/2009 | Fukano | H02K 7/06 |
| | | | | 74/89.33 |
| 2011/0181221 | A1* | 7/2011 | Asahi | H02K 29/08 |
| | | | | 318/400.39 |
| 2013/0257198 | A1* | 10/2013 | Barton | H02K 7/116 |
| | | | | 310/54 |
| 2014/0368192 | A1* | 12/2014 | Kaneko | G01D 5/145 |
| | | | | 324/207.25 |
| 2016/0141940 | A1 | 5/2016 | Hager | |
| 2017/0040874 | A1* | 2/2017 | Han | G01D 11/24 |
| 2018/0292197 | A1* | 10/2018 | Furukawa | G01D 5/145 |
| 2018/0299296 | A1* | 10/2018 | Mori | G01D 5/16 |
| 2019/0139689 | A1 | 5/2019 | Ogawa et al. | |
| 2019/0140523 | A1* | 5/2019 | Helmut | H02K 11/01 |
| 2019/0248406 | A1* | 8/2019 | Kaneko | B62D 5/04 |
| 2019/0379254 | A1* | 12/2019 | Denefleh | H02K 7/116 |
| 2020/0036266 | A1* | 1/2020 | Uematsu | H02K 7/003 |

FOREIGN PATENT DOCUMENTS

| | | | |
|---|---|---|---|
| DE | 102017218648 A1 | 4/2019 | |
| JP | 2012005260 A | 1/2012 | |
| JP | 5959693 B1 | 8/2016 | |
| JP | 5996464 B2 | 9/2016 | |
| JP | 2014183674 A * | 12/2016 | ............ H02K 11/21 |
| JP | 2016226094 A | 12/2016 | |
| KR | 20150068148 A | 6/2015 | |
| WO | 2018011883 A1 | 1/2018 | |
| WO | WO-2018062005 A1 * | 4/2018 | ............ B62D 5/065 |

OTHER PUBLICATIONS

U.S. Appl. No. 17/773,984, filed Nov. 16, 2024_WO_2018062005_A1_H.pdf (Year: 2024).*
International Search Report for PCT/EP2020/077063, Issued Jan. 14, 2021.

* cited by examiner

ELECTRICALLY CONTROLLABLE DRIVE ASSEMBLY

FIELD

The present invention relates to an electrically controllable drive assembly.

BACKGROUND INFORMATION

Such drive assemblies are used for example in electronically slip-controllable brake systems of motor vehicles in order to drive a pressure-producing unit in the context of a brake pressure regulation. An electrical controlling of the drive assembly is here carried out by an electronic control device of the brake system. In the case of electrical controlling of the drive assembly, the thus actuated pressure-producing unit conveys a pressure medium inside a brake circuit from a supply container of the brake system to connected wheel brakes. A brake pressure thereupon builds up in the wheel brakes in a manner proportional to the conveyed volume of pressure medium.

With the aid of additional control devices that are controllable by the electronic control device, this brake pressure can be adapted in wheel-individual fashion to the slip conditions prevailing currently at each of the associated wheels of the vehicle. In this way, wheel slippage can be prevented, consequently improving the driving stability of a vehicle. In addition, braking processes can be carried out independently by the driver as a function of the traffic situation at that moment.

In these control and/or regulation processes, the volume of pressure medium displaced by the pressure-producing unit is a decisive characteristic variable that can be determined from the actuation signals of the pressure-producing unit. For this purpose, sensor devices acquire the angle of rotation of the rotor of the drive assembly, and forward the measured rotational angle signal to the electronic control device for evaluation.

Such sensor devices are made up of a signal transmitter that rotates with the motor shaft and an associated signal receiver that in contrast is situated in stationary fashion.

An electrically controllable drive assembly is described, for example, in German Patent Application No. DE 10 2017 218 648 A1. Such a drive assembly 10 is also shown in FIG. 1 herein. This drive assembly 10 includes an electric motor 12 having a rotor 14 that can be driven to execute a rotational movement, as well as a motor shaft 16 connected in rotationally fixed fashion to rotor 14. Rotor 14 has a conventional design and has an iron core, as well as a plurality of coils wound thereon and situated next to one another in the circumferential direction of the iron core. In a known manner, when current flows through the coils, the coils form magnets that interact with magnets situated in stationary fashion on an oppositely situated inner surface of a housing 18 of drive assembly 10, in such a way that rotor 14 and motor shaft 16 execute a rotational movement. For this purpose, as an example motor shaft 16 is rotatably mounted in housing 18 by roller bearings 20. According to FIG. 1, as an example a plurality of eccentric elements 22 are situated on motor shaft 16 in order to actuate devices (not shown) that are situated transverse to motor shaft 16.

Detail X in FIG. 1 shows a signal transmitter 24 of a sensor device for the electronic acquisition and evaluation of the angle of rotation of rotor 14. This signal transmitter 24 is situated on the end face of motor shaft 16 facing away from rotor 14. It has a magnetic element 26 that is indirectly fastened to motor shaft 16 via a holding element 28. Holding element 28 is fashioned in the shape of a cup and is made of a magnetically non-conductive material. From a base of holding element 28 there protrudes a projection 30 with which holding element 28 is pressed into an associated center bore 32 of motor shaft 16, and is glued therein. On the opposite side of holding element 28 there is a blind hole-type recess 34 that is outwardly open in which magnetic element 26 is placed with a positive fit and so as to terminate flush outwardly. A fixing of magnetic element 26 in this recess 34 of holding element 28 is also accomplished by a glued connection.

Under operating conditions of this drive assembly, rotor 14 is often strongly accelerated or decelerated. The dynamic, axial, and radial forces that then occur place loads on the described glued connections and can have the result that magnetic element 26 of signal transmitter 24 carries out undesired movements, in particular axial ones, relative to motor shaft 16. These relative movements result in inaccuracies in the acquisition of the traveled angle of rotation of motor shaft 16, and consequently may cause errors in the electrical controlling of electric motor 12 of drive assembly 10, or in the controlling of the displaced volume of pressure medium. The latter has an undesirable influence on the brake pressure regulation.

SUMMARY

An electrically controllable drive assembly in accordance with the present invention, in contrast, may have the advantage that the fastening of the signal transmitter to the motor shaft is done without glued connections. This eliminates elasticities, and the acquisition of the angle of rotation signal takes place with greater accuracy. Increased accuracy brings an improvement in the electrical controllability of the drive assembly, and consequently a reduction in possible deviations between an actually conveyed volume of pressure medium and a desired target value. Apart from this, the omission of the glued connections simplifies the manufacturing process of the drive assembly in large-series production, and saves manufacturing time and costs.

According to an example embodiment of the present invention, these advantages are achieved by a holding element that is realized as a hollow cylinder in the interior of which the magnetic element of a signal transmitter is accommodated. The hollow cylinder has an open first end with which the holding element, including the magnetic element placed therein, is fastened to the motor shaft, as well as a second end, situated opposite thereto, having holding element segments that extend into the open cross-section of the hollow cylinder. The magnetic element of the signal transmitter abuts these holding element segments, and is thereby secured against falling out from the holding element.

The holding element according to an example embodiment of the present invention can be produced at low cost using a deep-drawing method, and holds the magnetic element of the signal transmitter in extremely rigid fashion. As a result, over its life span, and regardless of the loading that occurs, this magnetic element assumes a constant position relative to the associated signal receiver during operation of the drive assembly.

Further advantages and advantageous developments of the present invention result from the disclosure herein.

Advantageously, on its end facing the holding element the motor shaft has a segment that is recessed in its outer diameter relative to the outer diameter of the motor shaft. The hollow cylindrical holding element is fastened to this segment with its open first end. The holding element can easily be pushed onto this segment of the motor shaft, and is then at the same time centered relative to the longitudinal axis of the motor shaft. Subsequently, it is materially bonded to the motor shaft by a first weld connection. A transition from the segment to the circumference of the motor shaft forms a shoulder that acts as an axial stop for the holding element when it is assembled onto the motor shaft. The coaxial configuration of the holding element, or of the signal transmitter, relative to the longitudinal axis of the motor shaft, as well as the length tolerance of the motor shaft-holding element unit, can be kept within relatively narrow limits due to the described constructive features of the components.

In another advantageous embodiment of the present invention, the magnetic element of the signal transmitter is held stationary by a clip element inside the holding element. For its part, the clip element is connected with a material bond to the holding element by a second weld connection. The weld connection increases the resistance to deformation of the unit made up of the holding element, signal transmitter, and motor shaft, and in addition the clip element, together with the second weld connection itself, ensures the fixing of the magnetic element in the holding element even when there are changes in temperature. In addition, the clip element makes it possible to set a constant air gap between an end face of the motor shaft and the magnetic element. The air gap deflects the magnetic flux in the direction of the signal receiver, which benefits the signal strength, or promotes the acquisition of the signal. The clip element can be produced at low cost, for example without the use of machining.

BRIEF DESCRIPTION OF THE DRAWINGS

An exemplary embodiment of the present invention is illustrated in the figures, and is explained in detail in the following description.

DETAILED DESCRIPTION OF EXAMPLE EMBODIMENT

Figure 1:
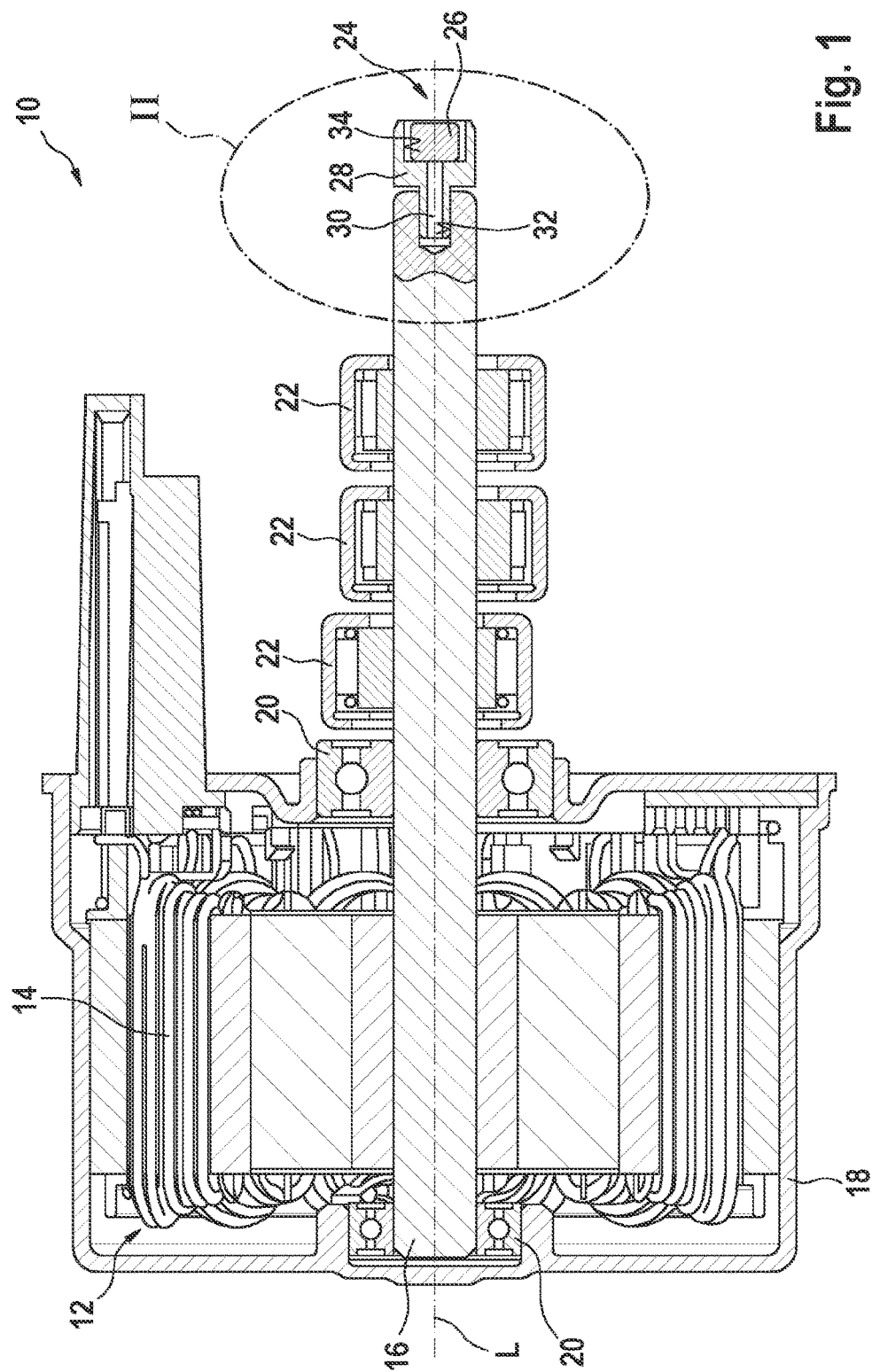
FIG. 1 shows a drive assembly of the related art.
Figure 2:
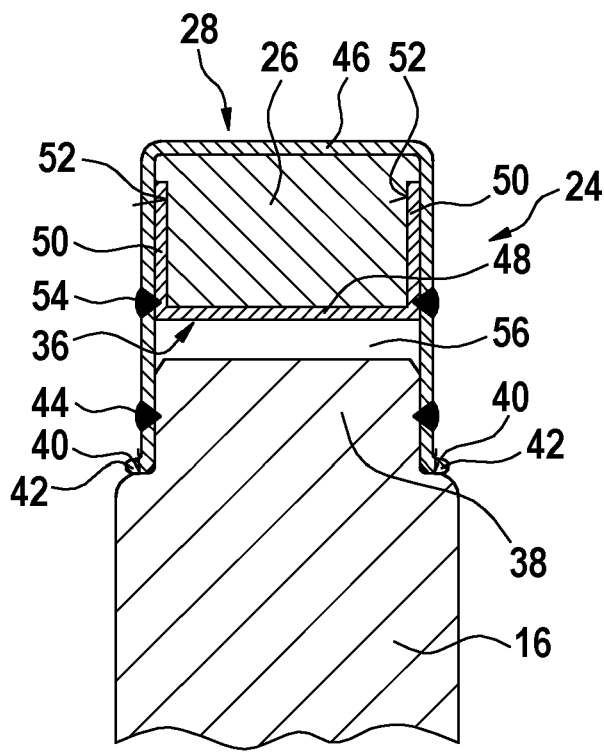
FIG. 2 shows detail X of FIG. 1 in an example embodiment according to the present invention.

FIG. 2 shows detail X of FIG. 1 in an embodiment according to the present invention. Depicted is motor shaft 16 of a drive assembly 10 in the region of its end facing away from a rotor 14 of an electric motor 12 (not shown). According to FIG. 2, this end of motor shaft 16 is equipped with a signal transmitter 24 of a sensor device.

Signal transmitter 24 includes, in a conventional manner, a magnetic element 26 that is fastened to the end face of motor shaft 16 by a holding element 28 made of magnetically non-conductive material. According to the present invention, holding element 28 is realized as a hollow cylinder, in the interior of which magnetic element 26 is accommodated and is fixedly anchored by a clip element 36. The hollow cylinder has an open first end with which it is pushed onto a segment 38 that is recessed relative to an outer diameter of motor shaft 16. A transition from the circumference of motor shaft 16 to the circumference of segment 38 is shown, as an example, as a right-angled shoulder 40. Holding element 28 abuts this shoulder 40 with a circumferential, radially protruding collar 42 that is fashioned on the open end of this holding element 28. Via segment 28 and its shoulder 40, holding element 28 can be oriented concentrically to a longitudinal axis L of motor shaft 16, and, after its at first positive-fit fastening to motor shaft 16, is in addition materially bonded to this motor shaft 16 by a first weld connection 44. In FIG. 2, this weld connection 44 is formed on the basis of an annular circumferential weld seam; however, alternatively a plurality of successive weld points or weld seam segments could also be provided around the circumference.

The second end of holding element 28, situated opposite the open first end of holding element 28 and accordingly facing away from motor shaft 16, forms holding element regions 46 that extend into the open cross-section of hollow cylindrical holding element 28, and for example can extend transversely over the entire open cross-section of holding element 28. Magnetic element 26 of signal transmitter 24 axially abuts holding element regions 46, and this magnetic element is accordingly mechanically secured against falling out from the interior of holding element 28.

A clip element 36 provides an axial fixing of magnetic element 26 inside holding element 28. The clip element is placed into holding element 28 with radial pre-tension, and in addition enters into a positive-fit connection with magnetic element 26.

Clip element 36 is preferably made of a rectangular plate strip, and is bent in a U shape. Correspondingly, clip element 36 has a base 48 that spans the end face, situated inside holding element 28, of magnetic element 26, and in addition has limbs 50 that are formed at both ends of this base 48 and that stand out at a right angle therefrom in the same direction. Groove-shaped recesses 52 are formed on the circumference of magnetic element 26, which grooves extend in the direction of longitudinal axis L of motor shaft 16, going out from the internal end face of magnetic element 26 up to a point just before its oppositely situated end face. One of the limbs 50 of clip element 36 lies in each recess 52.

Clip element 36 is materially bonded to holding element 28 by a second weld connection 54. As shown in FIG. 2, the weld seam of this second weld connection 54 is made in circumferentially annular fashion, but alternatively can also be made up of a plurality of weld seam segments that succeed one another in the circumferential direction, or of a plurality of weld points. Thus, magnetic element 26 of signal transmitter 24 is held between holding element region 46, which extends into the open cross-section of hollow cylindrical holding element 28, and clip element 36.

Between the end face of magnetic element 26, situated inside holding element 28, and a facing end face of motor shaft 16, there is an axial distance and therefore an air gap 56 that at least largely excludes an influencing of the magnetic flux of magnetic element 26 by motor shaft 16.

Figure 3:
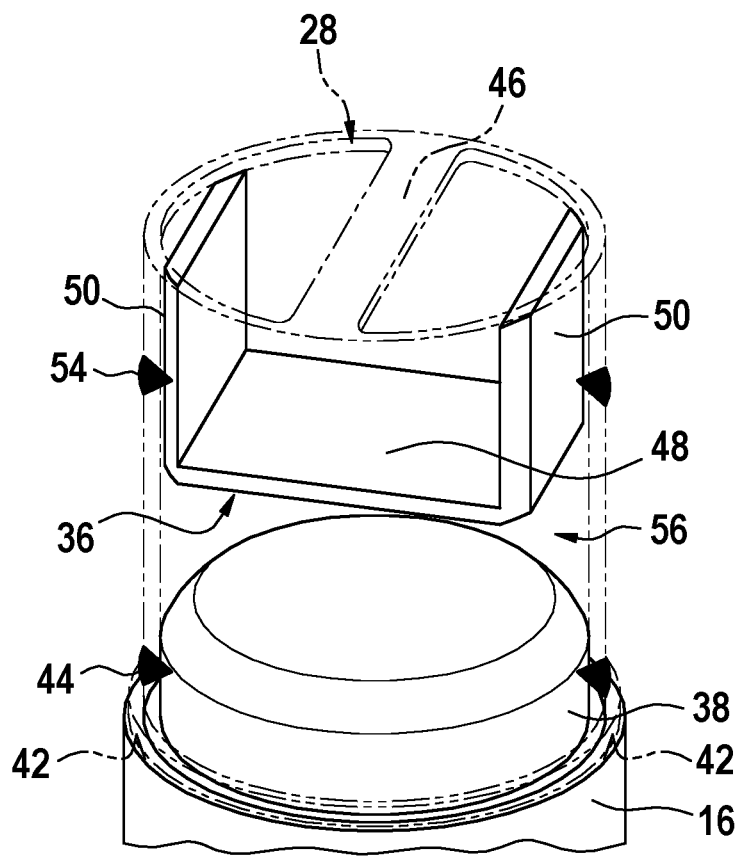
FIG. 3 shows the signal transmitter of FIG. 2 without the magnetic element placed therein, in a perspective view.

FIG. 2 shows the described holding element 28 again, in a perspective representation. Corresponding components or parts of components are provided with the same reference characters in FIGS. 2 and 3, for simplicity. However, in FIG. 3 the magnetic element of signal transmitter 24 is not shown, in order to better illustrate the design of holding element 28 and of clip element 36.

In this exemplary embodiment, holding element region 46, extending into the open cross-section of holding element 28, is realized as a transverse web that extends over the entire opening cross-section of holding element 28, and divides this opening cross-section into two partial opening cross-sections 58 separate from one another. In principle, it is possible to provide a plurality of such transverse webs and to subdivide the opening cross-section of holding element 28 into further partial opening cross-sections.

Of course, modifications of or supplements to the described exemplary embodiment are possible without departing from the basic idea of the present invention according to Claim 1, as explained above.

What is claimed is:

1. An electrically controllable drive assembly, comprising:
    an electronically commuted electric motor, including:
        a rotor capable of being driven to execute a rotational movement;
        a motor shaft connected in a rotationally fixed fashion to the rotor;
        a signal transmitter, situated on the motor shaft, of a sensor device configured for electronic acquisition and evaluation of an angle of rotation of the motor shaft;
        a holding element; and
        a magnetic element situated on the holding element;
        wherein the holding element is a hollow cylinder in whose interior the magnetic element is held, the holding element having an open first end with which the holding element with the magnetic element is fastened to the motor shaft and the holding element having a second end which is an opposite end of the holding element relative to the open first end, the second end being situated facing away from the motor shaft, and having at least one holding element region extending into an open cross-section of the holding element, the magnetic element abutting the holding element region;
        wherein the magnetic element of the signal transmitter is fastened inside the holding element by a clip element, the clip element being a rectangular steel plate strip bent into a U shape element, a base of the U-shape element spanning a cross-section of the magnetic element, and limbs of the U shape element connected to the base of the U shape element, extending on a circumference of the magnetic element in a direction of a longitudinal axis of the motor shaft, the magnetic element is held between the limbs of the U shape element.

2. The drive assembly as recited in claim 1, wherein the motor shaft has, at an end facing the holding element, a segment that is recessed in its outer diameter relative to an outer diameter of the motor shaft, the signal transmitter being fastened with the open end of the holding element, the open end of the holding element circumferentially surrounding the segment of the motor shaft.

3. The drive assembly as recited in claim 2, wherein a transition from the segment of the motor shaft to a circumference of the motor shaft forms a shoulder that the holding element abuts.

4. The drive assembly as recited in claim 1, wherein the clip element is materially bonded to the holding element by a first weld connection that extends in a circumferential direction of the holding element.

5. The drive assembly as recited in claim 1, wherein the holding element is materially bonded to the motor shaft by a second weld connection that extends in a circumferential direction of the holding element.

6. The drive assembly as recited in claim 1, wherein the holding element region of the holding element is fashioned as a transverse web that subdivides the open cross-section of the holding element into a plurality of partial opening cross-sections.

7. The drive assembly as recited in claim 1, wherein the magnetic element of the signal transmitter is fastened between the holding element region of the holding element and the base of the U shape element.

8. The drive assembly as recited in claim 1, wherein an extension of the holding element and an extension of the magnetic element, each in a direction of the longitudinal axis of the motor shaft, are calibrated to one another in such a way that, in a state in which the signal transmitter is mounted on the motor shaft, there is an air gap between an end face of the motor shaft and the end face, facing the motor shaft, of the magnetic element.

9. The drive assembly as recited in claim 1, wherein the magnetic element includes grooves on an outer surface of the magnetic element, the grooves extending in the direction of the longitudinal direction of the motor shaft, each of the limbs of the U shape element extending into one of the grooves.

10. The drive assembly as recited in claim 1, wherein the limbs of the U shape element extend from the base of the U shape element in a direction toward the second end of the holding element.

11. The drive assembly as recited in claim 1, wherein the U shape element is completely within the holding element.

12. The drive assembly as recited in claim 1, wherein the motor shaft has a segment which is recessed in its outer diameter relative to a diameter of the motor shaft, the holding element being fastened to and outside surface of the recessed segment via the open end of the holding element, a transition from the segment toe motor shaft forming a shoulder that abuts the holding element.

* * * * *